United States Patent Office 3,403,164
Patented Sept. 24, 1968

3,403,164
9b-ARYL-1,2,3,9b-TETRAHYDRO-5H-IMIDAZO
[2,1-a]ISOINDOL-5-ONES
William J. Houlihan, Mountain Lakes, N.J., assignor to
Sandox Inc., Hanover, N.J.
No Drawing. Filed Nov. 25, 1966, Ser. No. 596,833
2 Claims. (Cl. 260—309.7)

This invention relates to tricyclic compounds. In particular, the invention pertains to 9b-aryl-1,2,3,9b-tetrahydro-5H-imidazo[2,1-a]isoindol-5-ones which may be represented structurally as follows:

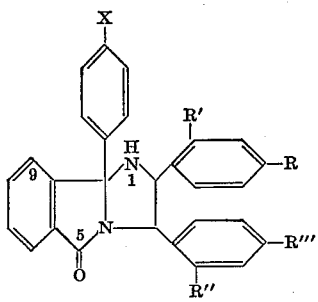

wherein
X represents hydrogen or chloro;
R and R''' are the same and represent hydrogen or chloro; and
R' and R'' are the same and represent hydrogen or chloro.

The above compounds are prepared by reacting an o-benzoylbenzoic acid with a 1,2-diphenylethylenediamine as illustrated by the following reaction scheme:

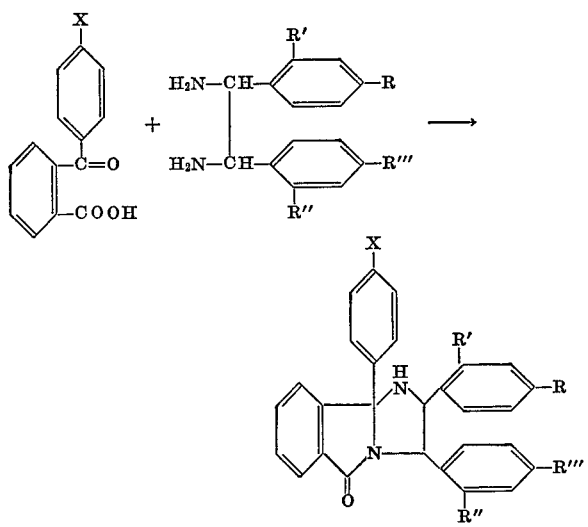

wherein X, R, R', R'' and R''' are as previously defined.

The above reaction is conveniently carried out in the presence of an inert organic solvent and at elevated temperatures. However, neither the solvent nor temperature employed is critical. Suitable solvents include benzene, toluene, xylene and chlorobenzene. Preferably, the reaction is carried out at reflux temperature to facilitate continuous removal of water. To facilitate the formation of water, the reaction may be carried out in the presence of a catalytic amount of hydrogen ions such as by the use of an alkyl or arylsulfonic acid, e.g., methanesulfonic acid, benzenesulfonic acid and p-toluenesulfonic acid. The desired product is readily isolated employing conventional techniques.

The end compounds of the present invention (Formula I) exist in meso, racemic or optically active forms, and such forms are included within the scope of this invention. The meso form is obtained by starting with a meso-1,2-diphenylethylenediamine. Similarly, the racemic form is obtained by employing a racemic 1,2-diphenylethylenediamine. The optically active forms (enantimorphs) are readily obtained by resolution of the racemate in conventional manner.

Various of the reactants, including the meso and racemic forms of the diamine reactant, employed in the above process are known and can be prepared as described in the literature. Such others which are not specifically described in the literature may be prepared in a manner analogous to that described in the literature for the preparation of the known compounds.

The compounds of structural Formula I are useful because they possess pharmacological activity in animals. In particular, the compounds are useful as hypotensive agents. For such usage the compounds may be combined with a pharmaceutically acceptable carrier, and such other conventional adjuvants as may be necessary, and administered orally in such forms as tablets, capsules, elixirs, suspensions and the like or parenterally in the form of an injectable solution or suspension. Furthermore, the compounds may be similarly administered in the form of their non-toxic pharmaceutically acceptable acid addition salts. Such salts possess the same order of activity as the free base, are readily prepared in conventional manner by reacting the base with the appropriate acid and accordingly are included within the scope of the invention. Representative of such salts are the mineral acid salts such as the hydrobromide, hydrochloride, sulfate and phosphate and the like and the organic acid salts such as the succinate, benzoate, acetate, maleate, p-toluenesulfonate, benzenesulfonate and the like.

As noted above, the compounds of structural Formula I exist as optical isomers. In some cases greater pharmacological activity or other beneficial attribute may be found with respect to a particular isomer, and in such instances administration of such isomer may be preferred.

For the above-mentioned use, the dosage administered will, of course, vary depending on the compound employed and the mode of administration. However, in general satisfactory results are obtained when administered at a daily dosage of from about 5 milligrams to about 15 milligrams per kilogram of animal body weight, preferably given in divided doses, 2 to 4 times a day, or in sustained release form. For mammals dosage forms suitable for internal administration comprise from about 100 milligrams to about 500 milligrams of the compound admixed with a solid or liquid phramaceutical carrier or diluent.

A representative formulation is a tablet (prepared by standard tabletting techniques) and containing the following ingredients:

| Ingredient: | Parts by weight |
|---|---|
| 9b - (p - chlorophenyl) - 2,3 - diphenyl - 1,2,3,9b - tetrahydro - 5H - imidazo[2,1 - a]isoindol-5-one | 50 |
| Tragacanth | 2 |
| Lactose | 39.5 |
| Corn starch | 5 |
| Talcum | 3 |
| Magnesium stearate | 0.5 |

The following example shows a representative compound encompassed within the scope of this invention and the manner in which such compound is prepared. However, it is to be understood that the example is for the purpose of illustration only and is not intended as in any way limiting the scope of the invention which is defined in the appended claims.

Example.—Meso-9b-(p-chlorophenyl)-2,3-diphenyl-1,2,3,9b-tetrahydro-5H-imidazo[2,1-a]isoindol-5-one

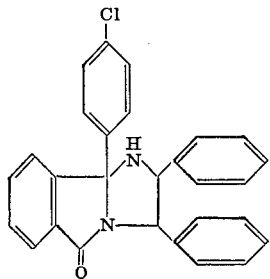

To a flask equipped with a stirrer, condenser and Dean-Stark tube is added 13.1 g. (0.05 mole) of o-(p-chlorobenzoyl)benzoic acid, 14.7 g. (0.07 mole) of meso-1,2-diphenylethylenediamine, 0.5 g. of p-toluenesulfonic acid and 500 ml. of toluene. The mixture is stirred and refluxed until water ceases to separate in the Dean-Stark tube. The resulting mixture is then evaporated in vacuo on a rotary evaporator and the residue crystallized from methylene chloride/diethyl ether (1:1) to obtain meso-9b-(p-chlorophenyl) - 2,3 - diphenyl - 1,2,3,9b - tetrahydro - 5H - imidazo[2,1-a]isoindol-5-one, M.P. 231° C.

What is claimed is:
1. A compound selected from the group consisting of compounds of the formula

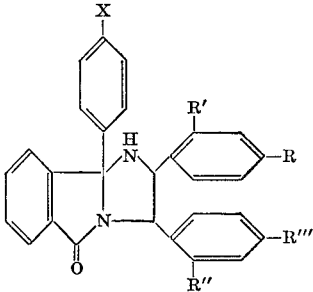

and a non-toxic acid addition salt thereof, wherein

X represents hydrogen or chloro;
R and R''' are the same and represent hydrogen or chloro; and
R' and R'' are the same and represent hydrogen or chloro.

2. The compound of claim 1 which is 9b-(p-chlorophenyl) - 2,3 - diphenyl - 1,2,3,9b - tetrahydro - 5H - imidazo[2,1-a]isoindol-5-one.

References Cited

Geigy: Chem. Abst., vol 64, columns 6664–5, (Feb. 28, 1966) (Abstract of Belgian Patent 659,530).

JOHN D. RANDOLPH, *Primary Examiner.*

N. TROUSOF, *Assistant Examiner.*